Feb. 18, 1936.  F. T. HARRIGAN  2,031,038
LAWN MOWER ATTACHMENT
Filed Sept. 18, 1934  3 Sheets-Sheet 1
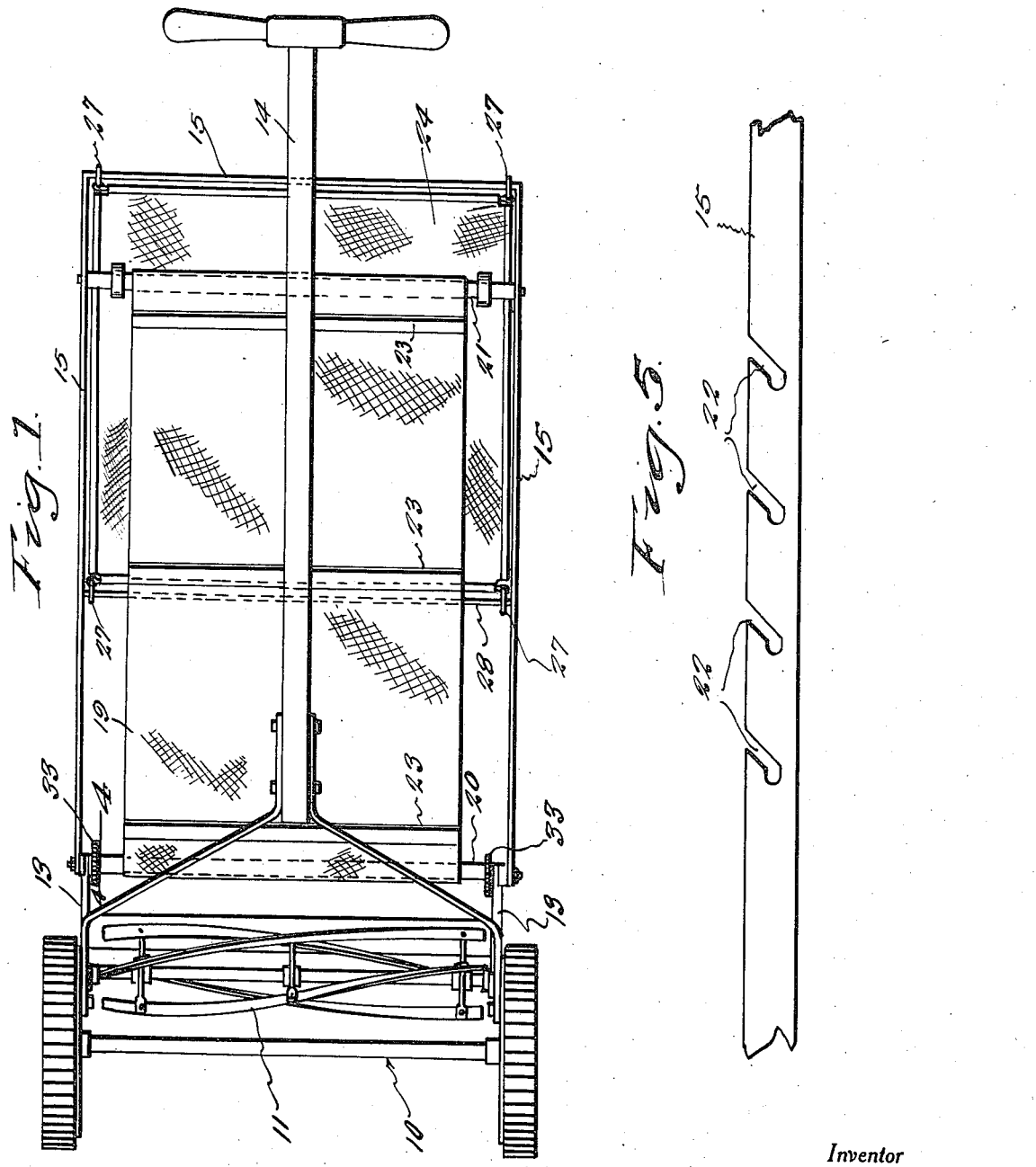
Inventor
Floyd T. Harrigan
By Clarence A. O'Brien
Attorney

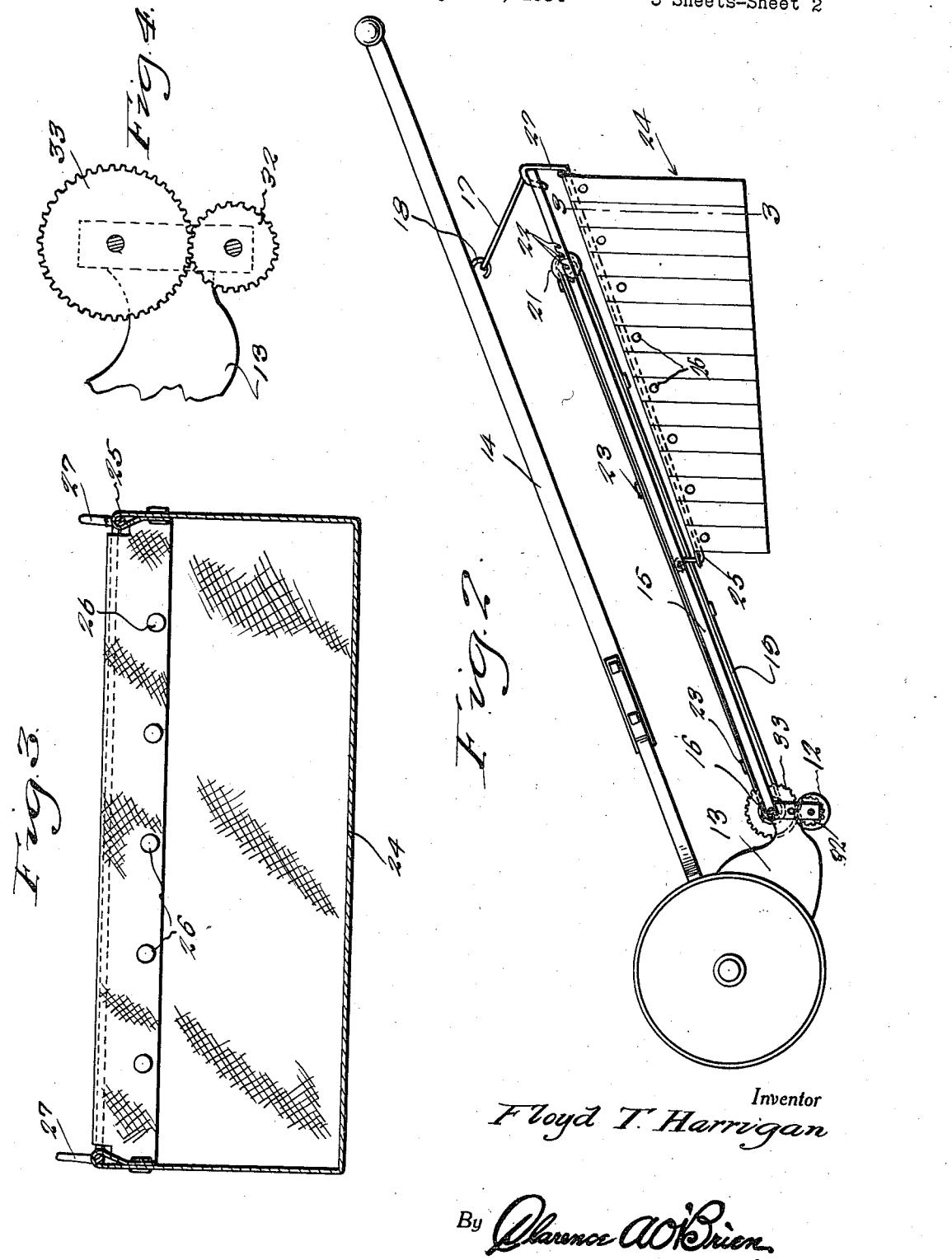

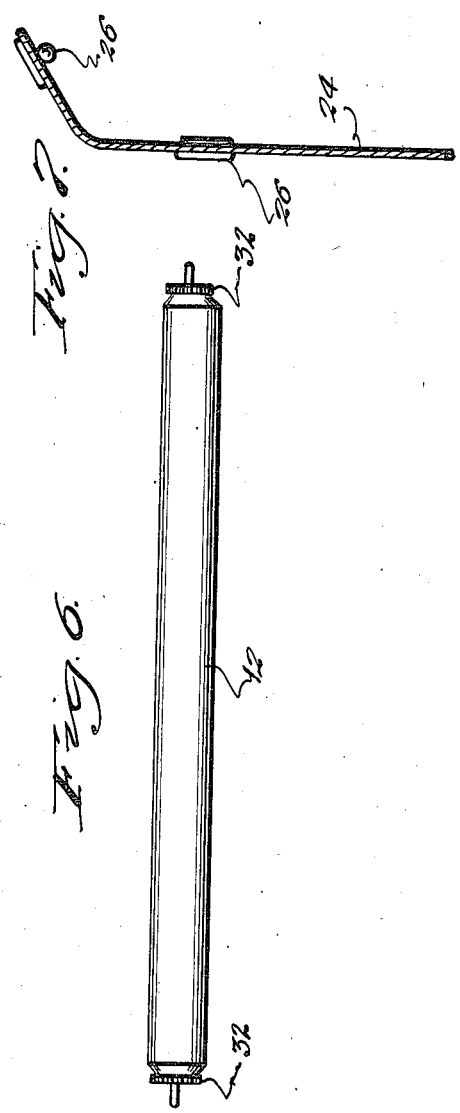

Patented Feb. 18, 1936

2,031,038

UNITED STATES PATENT OFFICE 2,031,038

LAWN MOWER ATTACHMENT

Floyd T. Harrigan, Hobart, Ind.

Application September 18, 1934, Serial No. 744,581

1 Claim. (Cl. 56—201)

This invention relates to attachments for lawn mowers and is in the nature of an elevator adapted to be mounted in operative position to the rotary knives of the mower for receiving the cut grass, together with a receptacle adapted to be suspended from the handle of the mower at the upper end of the elevator for receiving the cut grass therefrom.

The invention together with its objects and advantages, will be best understood from a study of the following description taken in connection with the accompanying drawings wherein:

Figure 1 is a plan view illustrating the application of the invention.

Figure 2 is a side elevational view.

Figure 3 is a detail view taken substantially on the line 3—3 of Figure 2.

Figure 4 is a detail view taken substantially on the line 4—4 of Figure 1.

Figure 5 is a fragmentary side elevational view of one of the sides of the main frame.

Figure 6 is an elevational view of one of the usual lawn mower rollers.

Figure 7 is a fragmentary detail sectional view through the body of the receptacle illustrating certain details hereinafter more fully referred to.

Referring to the drawings by reference numerals, it will be seen that 10 indicates generally a lawn mower including among other parts the rotary cutting knives 11, roller 12, and suspension frame 13 for the roller. The handle for the lawn mower is indicated by the reference numeral 14.

The attachment per se comprises a substantially U-shaped frame 15 the sides of which at the open end of the frame are bolted to the roller frame 13, or secured to said frame in any suitable manner and as indicated generally at 16. The upper end of the frame 15 is suspended from the handle 14 through the medium of a link 17 suitably connected at one end with the frame 15 and at a relatively opposite end engaged with a hook 18 carried by the lawn mower handle 14.

Operating within the frame 15 is an endless elevator 19 having a lower roller 20 suitably journaled between the sides of the roller frame 13 and an upper roller 21 the pintles of which are adapted to be engaged in selected notches 22 provided in the sides of the frame 18. By reason of the notches 22 the roller 21 may be spaced relative to the roller 20 in a manner to take up slack in the endless apron of the elevator 19. The elevator 19 is also provided with suitably spaced cleats 23 that serve to retain the grass on the elevator against sliding back in a manner to clog the reel 11. It will thus be seen that the grass cut by the reel 11 will be received on the elevator 19 and conveyed upwardly and away from the reel.

For receiving the cut grass from the elevator 19 there is provided a canvas receptacle 24, the body of which as just mentioned is formed of canvas, the opposite side walls of the body being cut on a bias and sloping in the direction of the reel of the lawn mower as clearly shown in Figure 2. The upper edge portions of the walls of the body of receptacle 24 are foldable over the sides of a rectangular frame 25, separable fasteners 26, 26' being provided for securing said edges of the walls in folded condition and in a manner to positively engage the body of the receptacle with the frame 25. At the corners thereof the frame 25 is provided with suspension hooks 27 that engage over the upper end of the main frame 15 and also over a cross bar 28 extending between opposed sides of the main frame as shown in Figure 1. The receptacle 24 being thus suspended from the upper portion of the frame 15 is in a position to receive the cut grass from the elevator 19.

For driving the elevator 19 there are provided on the ends of the roller 12 gears 32 which are in mesh with gears 33 provided on the ends of the elevator roller 20. Obviously, as the lawn mower is pushed over the ground causing the roller 12 to rotate in the usual manner, motion is transmitted from the roller 12 through the gearing 32 and 33 to the roller 20 for operating the endless elevator. As the elevator 19 is in operation, the cut grass falling thereon is conveyed to the receptacle 24, and when this receptacle has received a certain amount of the grass it may be quickly and easily removed and emptied of its grass contents.

What is claimed is:

A grass conveyor for lawn mowers comprising a rectangular-shaped frame adapted to be secured adjacent the reel of a lawn mower, a transversely mounted roller in one end of said frame, a second roller, an endless apron trained around said rollers, the sides of said frame having a plurality of spaced oppositely disposed angularly arranged slots therein, said second roller being adapted to be arranged in pairs of said slots for controlling the slack in said apron, a driving connection between the lawn mower and the first named roller, and a receptacle detachably suspended from the frame for receiving the grass from the elevator.

FLOYD T. HARRIGAN.